United States Patent
Godbole et al.

(10) Patent No.: US 9,755,932 B1
(45) Date of Patent: Sep. 5, 2017

(54) MONITORING PACKET RESIDENCE TIME AND CORRELATING PACKET RESIDENCE TIME TO INPUT SOURCES

(71) Applicant: Juniper Networks, Inc., Sunnyvale, CA (US)

(72) Inventors: Avanindra Godbole, San Jose, CA (US); Jainendra Kumar, Fremont, CA (US); Gregory M. Waters, Groton, MA (US)

(73) Assignee: Juniper Networks, Inc., Sunnyvale, CA (US)

( * ) Notice: Subject to any disclaimer, the term of this patent is extended or adjusted under 35 U.S.C. 154(b) by 389 days.

(21) Appl. No.: 14/498,440

(22) Filed: Sep. 26, 2014

(51) Int. Cl.
  *H04L 12/26* (2006.01)
  *H04L 12/875* (2013.01)
  *H04L 12/801* (2013.01)

(52) U.S. Cl.
  CPC ........ *H04L 43/0858* (2013.01); *H04L 43/106* (2013.01); *H04L 47/11* (2013.01); *H04L 47/562* (2013.01)

(58) Field of Classification Search
  None
  See application file for complete search history.

(56) References Cited

U.S. PATENT DOCUMENTS

| | | | | |
|---|---|---|---|---|
| 2009/0245104 | A1* | 10/2009 | Nishimura | H04L 47/10 370/230 |
| 2011/0128853 | A1* | 6/2011 | Nishimura | H04L 47/10 370/235 |
| 2011/0286468 | A1* | 11/2011 | Tomonaga | H04L 47/10 370/412 |
| 2012/0106345 | A1* | 5/2012 | Diab | H04L 12/4625 370/236 |
| 2012/0250514 | A1* | 10/2012 | Hiramoto | H04L 45/121 370/237 |
| 2013/0016609 | A1* | 1/2013 | Hayakawa | H04L 69/324 370/230 |

(Continued)

OTHER PUBLICATIONS

Wikipedia, "Precision Time Protocol," http://en.wikipedia.org/wiki/Precision_Time_Protocol, Mar. 18, 2014, 8 pages.

*Primary Examiner* — Ayaz Sheikh
*Assistant Examiner* — Mariela Vidal Carpio
(74) *Attorney, Agent, or Firm* — Harrity & Harrity, LLP

(57) ABSTRACT

An output circuit, included in a device, may determine counter information associated with a packet provided via an output queue managed by the output circuit. The output circuit may determine that a latency event, associated with the output queue, has occurred. The output circuit may provide the counter information and time of day information associated with the counter information. The output circuit may provide a latency event notification associated with the output queue. An input circuit, included in the device, may receive the latency event notification associated with the output queue. The input circuit may determine performance information associated with an input queue. The input queue may correspond to the output queue and may be managed by the input circuit. The input circuit may provide the performance information associated with the input queue and time of day information associated with the performance information.

20 Claims, 12 Drawing Sheets

(56) References Cited

U.S. PATENT DOCUMENTS

| | | | | |
|---|---|---|---|---|
| 2013/0347103 | A1* | 12/2013 | Veteikis | H04L 43/04 |
| | | | | 726/22 |
| 2014/0012961 | A1* | 1/2014 | Pope | H04L 69/14 |
| | | | | 709/220 |
| 2014/0071831 | A1* | 3/2014 | Sinha | H04L 41/0213 |
| | | | | 370/241.1 |
| 2014/0269379 | A1* | 9/2014 | Holbrook | H04L 43/0882 |
| | | | | 370/252 |
| 2014/0348184 | A1* | 11/2014 | Kure | H04N 21/242 |
| | | | | 370/503 |
| 2015/0139251 | A1* | 5/2015 | Tzeng | H04J 3/0661 |
| | | | | 370/503 |
| 2015/0229575 | A1* | 8/2015 | Bottorff | H04L 47/12 |
| | | | | 370/230 |
| 2016/0219088 | A1* | 7/2016 | Ma | H04L 65/605 |

* cited by examiner

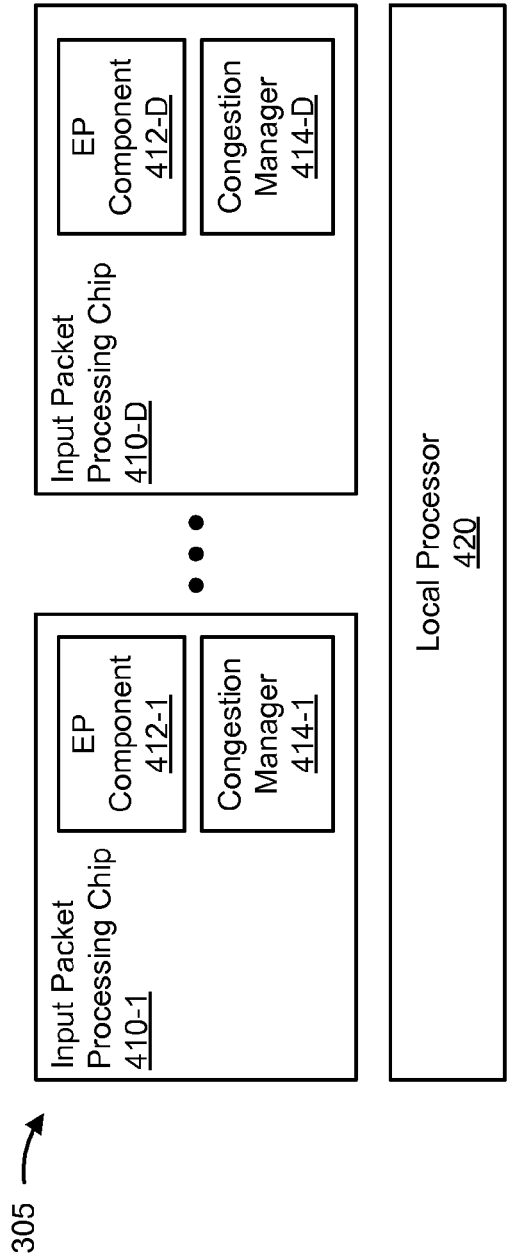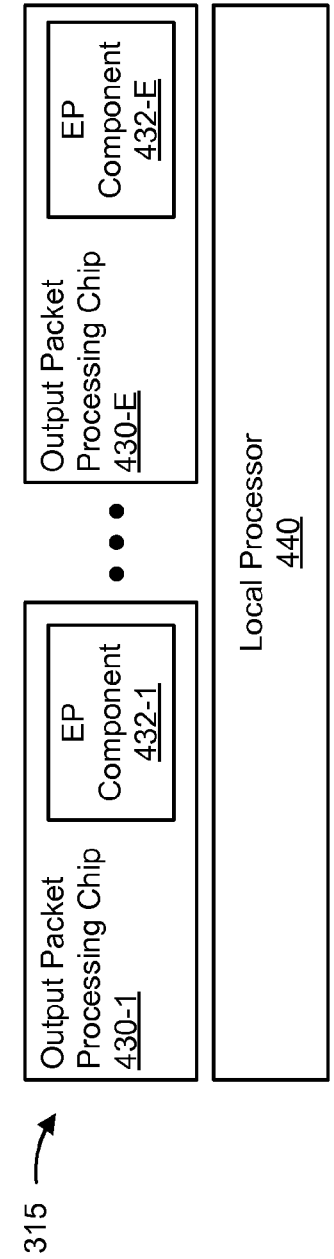

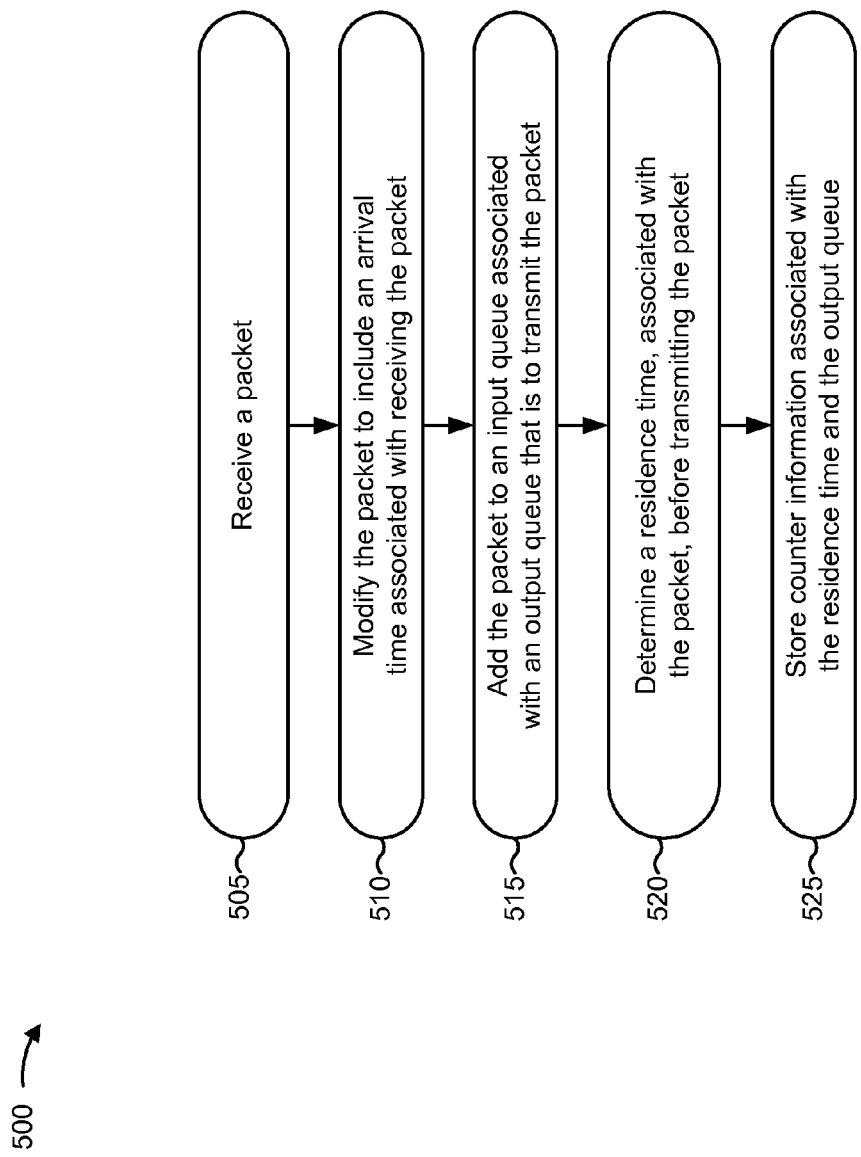

MONITORING PACKET RESIDENCE TIME AND CORRELATING PACKET RESIDENCE TIME TO INPUT SOURCES

BACKGROUND

A residence time of a packet within a network device may include a quantity of time between an arrival time (e.g., a time that the packet is received by the network device) and a transmission time (e.g., a time that the packet is transmitted by the network device). Residence time may be used for network visibility purposes, network debugging purposes, network planning purposes, or the like. Residence time may also be referred to as latency or delay.

SUMMARY

According to some possible implementations, a network device may comprise an output circuit and an input circuit, where the output circuit may: determine counter information associated with a packet provided via an output queue, where the output queue may be managed by the output circuit; determine, based on the counter information, that a latency event, associated with the output queue, has occurred; provide, based on determining that the latency event has occurred, the counter information and time of day information associated with the counter information; and provide, based on determining that the latency event has occurred, a latency event notification associated with the output queue; and where the input circuit may: receive the latency event notification associated with the output queue; determine performance information associated with an input queue, where the input queue may correspond to the output queue and may be managed by the input circuit; and provide the performance information associated with the input queue and time of day information associated with the performance information.

According to some possible implementations, a device may comprise an output component and an input component, where the output component may: determine counter information associated with a packet provided via an output queue, where the output queue may be associated with the output component; determine, based on the counter information, that a latency event, associated with the output queue, has occurred; provide, based on determining that the latency event has occurred, the counter information and time of day information associated with the counter information; provide, based on determining that the latency event has occurred, a latency event notification associated with the output queue; and where the input component may: receive the latency event notification associated with the output queue; determine performance information associated with an input queue where the input queue may correspond to the output queue and may be associated with the input component; and provide the performance information associated with the input queue and time of day information associated with the performance information to permit performance information to be correlated with the counter information.

According to some possible implementations, a method may include determining, by an output component included in a network device, counter information associated with a packet provided via an output queue, where the output queue may be managed by the output component; determining, by the output component and based on the counter information, that a latency event, associated with the output queue, has occurred; providing, by the output component and based on determining that the latency event has occurred, the counter information and time of day information associated with the counter information; providing, by the output component, a latency event notification associated with the output queue; receiving, by an input component included in a network device, the latency event notification associated with the output queue; determining, by the input component, performance information associated with an input queue, where the input queue may correspond to the output queue and being managed by the input component; providing, by the input component, the performance information associated with the input queue and time of day information associated with the performance information; determining, by the input component, congestion information for a set of input queues, where the set of input queues may be associated with the input component; and providing, by the input component, the congestion information and time of day information associated with the congestion information.

BRIEF DESCRIPTION OF THE DRAWINGS

FIGS. 4A and 4B are diagrams of example components of an input component and an output component shown in FIG. 3A;

FIG. 5 is a flow chart of an example process for determining a residence time, associated with a packet received by a network device and being transmitted via an output queue, associated with the network device, and storing counter information associated with the output queue;

DETAILED DESCRIPTION

Figure 1A:
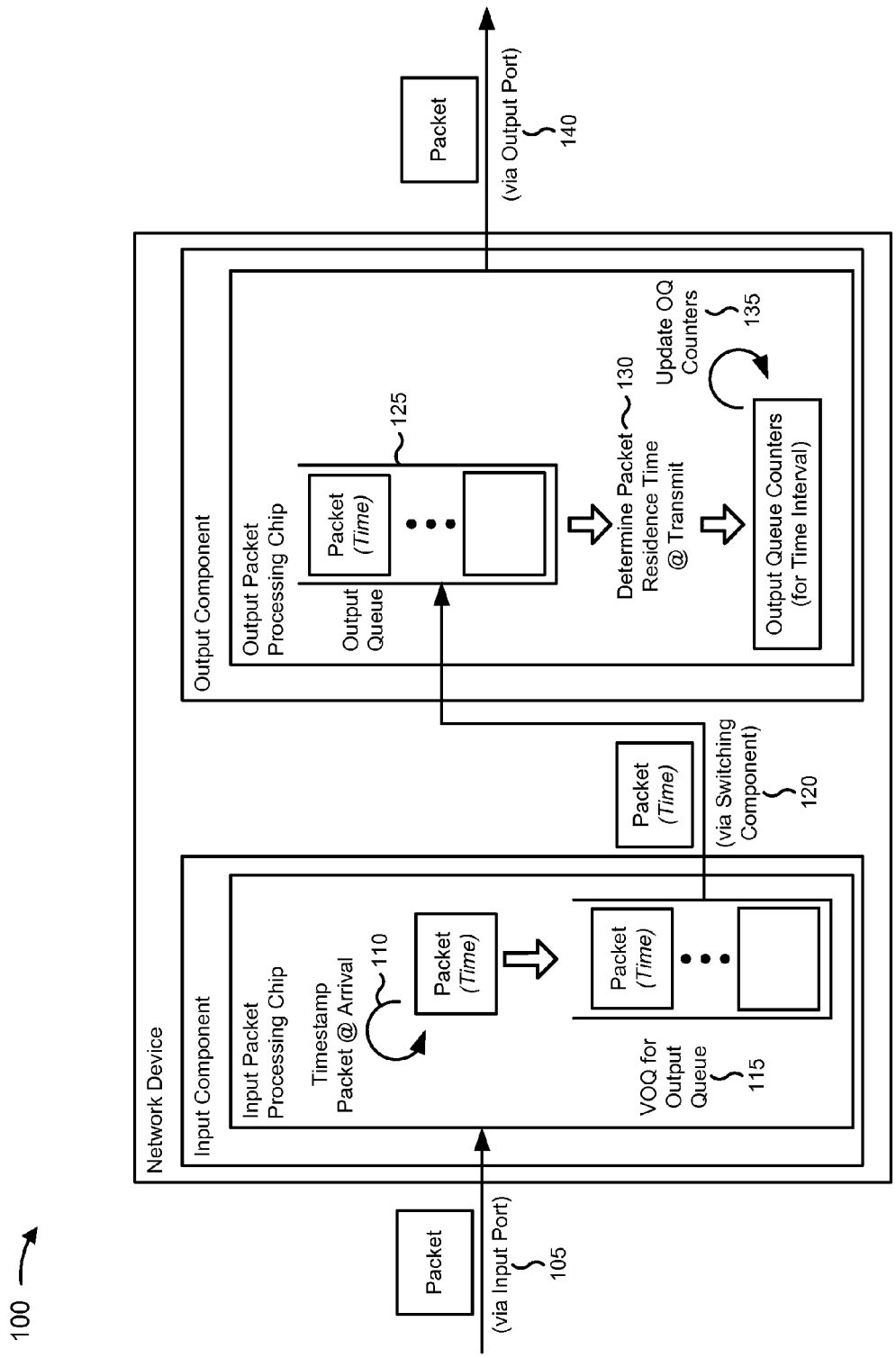
FIGS. 1A and 1B are diagrams of an overview of an example implementation described herein.

The following detailed description of example implementations refers to the accompanying drawings. The same reference numbers in different drawings may identify the same or similar elements.

A service provider network may include multiple network devices associated with transferring customer traffic (e.g., packets). However, as part of managing the service provider network, the service provider may wish to be able to correlate short term network service deviations and/or long term network service deviations (e.g., in terms of latency, packet delay, etc.) with queue performance associated with one or more network devices. For example, if a customer reports a latency event (e.g., a high amount of latency associated with a customer service), then the service provider may wish to identify which queues, managed by the network devices, are contributing to the latency event.

If the service provider were able to correlate a short term network service deviation with one or more queues (e.g., a spike in latency lasting milliseconds, a second, etc.), then the service provider may be able to take corrective action. For example, the service provider may cause one or more network devices to change a packet discard profile, select a different routing nexthop, and so on. Similarly, if the service provider were able to correlate a long term network service deviation with one or more queues (e.g., an excessive amount of latency over a period of minutes, hours, days, etc.), then the service provider may use this information for network analytics, capacity planning, service level agreement enforcement, debugging, or the like.

One problem with correlating such network service deviations with queues is that a short term unit of time (e.g., microseconds, milliseconds, etc.) is too small for a software based solution (e.g., due to large processing workloads). Another problem is correlation of queue performance across multiple network devices. In order to correlate performance information across multiple network devices, each network device must keep a uniform time of day. If all network devices report performance information and/or network service deviations along with a time of day, then the service provider may correlate performance information across the multiple network devices. For example, if a particular network device reports (e.g., at a microsecond level), that a latency, associated with a particular queue, has increased beyond a threshold amount, then the service provider may be able to correlate the increased latency with another latency event, associated with another network device, another queue, or the like, that has been reported at the same time of day.

Implementations described herein may allow a network device, included in a service provider network (e.g., that implements a protocol used to synchronize network device clocks throughout the service provider network), to identify a latency event associated with an output queue managed by the network device. The network device may also determine performance information, associated with an input queue corresponding to the output queue, and determine congestion information for a set of other input queues associated with the input queue. In this way, the service provider may collect performance information and/or congestion information, associated with multiple network devices, that may allow the service provider to correlate short term network service deviations and/or long term network service deviations with one or more queues and/or one or more network devices.

Figure 1B:
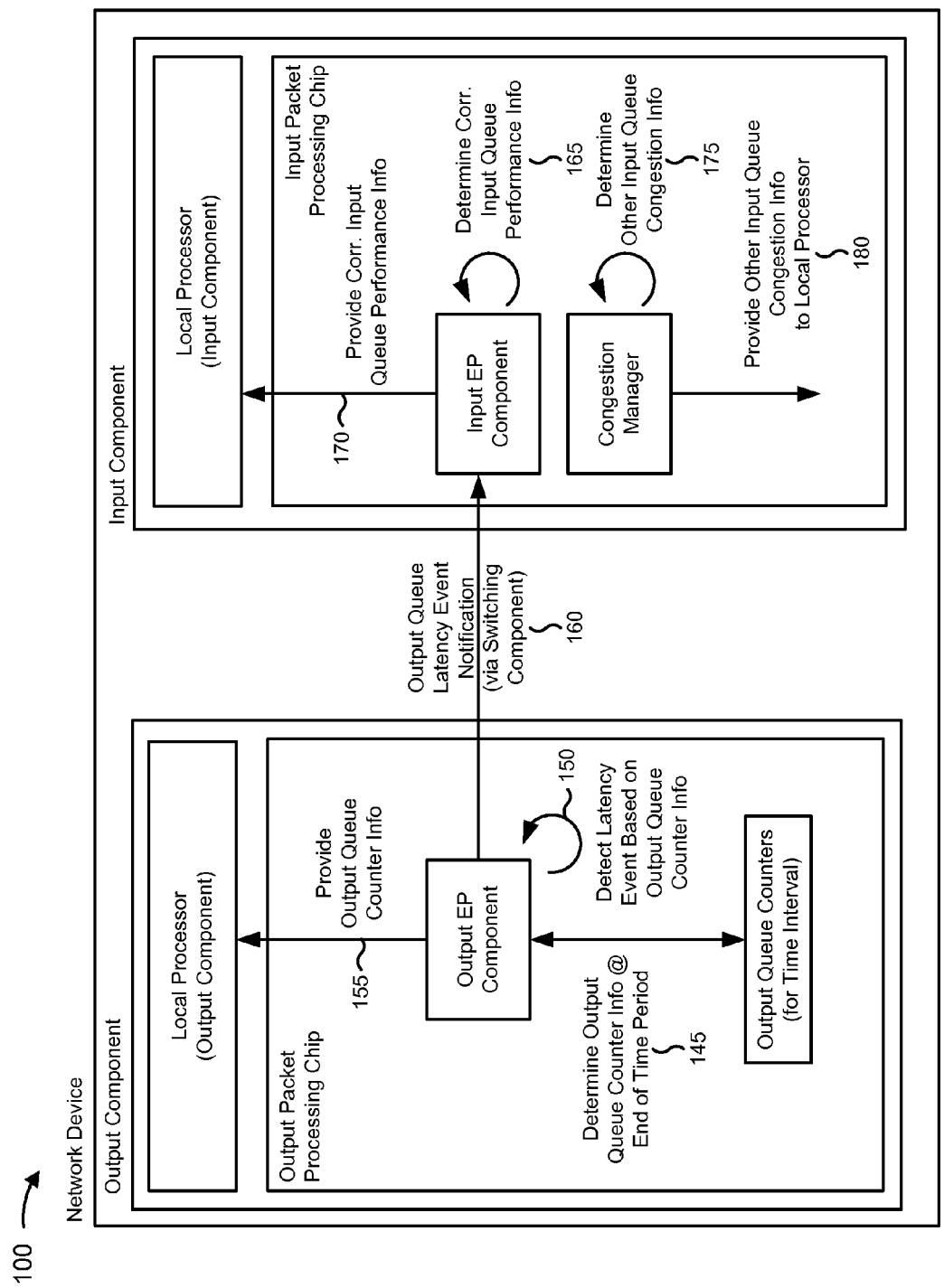

FIGS. 1A and 1B are diagrams of an overview of an example implementation 100 described herein. For the purposes of example implementation 100, assume that a network device includes one or more input components, and that each input component includes one or more input packet processing integrated circuits (herein referred to as chips) associated with queuing, processing, providing, etc. packets received via one or more input ports. Further, assume that the network device includes one or more output components, and that each output component includes one or more output packet processing chips associated with queuing, monitoring, processing, etc. the packets and transmitting the packets via one or more output ports. Finally, assume that the network device implements a protocol associated with synchronizing clocks across multiple network devices (e.g., such as precision time protocol (PTP)).

As shown in FIG. 1A, and by reference number 105, assume that the input packet processing chip receives a packet via an input port (e.g., an input port managed by the input packet processing chip). As shown by reference number 110, the input packet processing chip may modify the packet to include a time stamp that identifies an arrival time associated with the packet. As shown by reference number 115, the input packet processing chip may identify (e.g., based on information included in the packet) an output queue (e.g., associated with an output port) through which the packet is to be provided, and may place the packet in an input queue (e.g., a virtual input queue (VOQ)) that corresponds to the output queue and that is managed by the input packet processing chip. As shown by reference number 120, the input packet processing chip may then provide the packet to an output packet processing chip that manages the output queue.

As shown by reference number 125, the output packet processing chip may place the packet in the output queue. As shown by reference number 130, when the output packet processing chip is ready to transmit the packet (e.g., when the packet reaches the front of the output queue), the output packet processing chip may determine a residence time associated with the packet (e.g., a time from the arrival time included in the packet to the time at which the output packet processing chip is ready to transmit the packet). As shown by reference number 135, the output packet processing chip may store and/or update counter information, associated with the output queue, based on the residence time and/or other information associated with the packet. The counter information may include information that identifies a total quantity of packets provided via the output queue during an interval of time (e.g., an interval of time identified by a configuration of the output packet processing chip, such as one millisecond, 100 milliseconds, etc.), a total quantity of bytes included in the packets provided via the output queue during the interval of time, a sum of residence times for the packets provided via the output queue during the interval of time, a maximum residence time for any packet provided via the output queue during the interval of time, or the like. As shown by reference number 140, the output packet processing chip may then provide the packet via the output port associated with the output queue.

For the purposes of FIG. 1B, assume that the output packet processing chip is configured to update the counter information for the interval of time and, when the interval of time lapses, an output embedded processing component (EP component), embedded in the output packet processing chip, is to determine whether the output queue experienced a latency event during the interval of time. As shown by reference number 145, the output EP component may determine counter information, associated with the output queue, when the interval of time lapses. As shown by reference number 150, assume that, based on the counter information, the output EP component determines that the output queue experienced a latency event (e.g., an average packet residence time above a threshold, a maximum packet residence time above a threshold, etc.) during the interval of time. As shown by reference number 155, the output EP component, upon determining that the latency event has occurred, may provide the counter information and time of day information associated with the counter information, to a local processor associated with the output component. In some implementations, the local processor may analyze, store, process, etc. the counter information and/or may provide the counter information to a collector device (e.g., a device external to the network device) associated with the service provider network. As shown by reference number 160, the output EP component may also provide (e.g., to one or more input packet processing chips included in one or more input components of the network device) a latency event notification after determining that the output queue has experienced the latency event.

As shown by reference 165, an input EP component, embedded in an input packet processing chip, may receive the latency event notification, and may determine performance information (e.g., an occupancy level, a drain rate, etc.) for an input queue, managed by the input packet processing chip, that corresponds to the output queue. In some implementations, the input EP component may monitor the corresponding input queue for a period of time in order to determine the performance information. As shown by reference number 170, the input EP component may provide the performance information, and time of day information associated with the performance information, to a local processor associated with the input component. As shown by reference number 175, a congestion manager component, associated with the input packet processing chip, may determine congestion information for other input queues (e.g., other input queues managed by the input packet processing chip). As shown by reference number 180, the congestion manager component may provide the congestion information, and time of day information associated with the congestion information, to the local processor associated with input component. In some implementations, the local processor may provide the performance information, the time of day information associated with the performance information, the congestion information, and the time of day information associated with the congestion information to the collector device associated with the service provider.

While example implementation 100 describes a single input packet processing chip receiving the latency event notification, in some implementations, multiple input packet processing chips may receive the latency event notification (e.g., such that each input packet processing chip that manages a VOQ corresponding to the output queue receives the latency event notification) and act similarly.

In this way, a network device, included in a service provider network (e.g., that implements a protocol used to synchronize network device clocks throughout the service provider network), may identify a latency event, associated with an output queue managed by the network device. The network device may also determine performance information, associated with an input queue corresponding to the output queue, and may determine congestion information for a set of other input queues associated with the input queue. In this manner, the service provider may collect performance information and/or congestion information, associated with multiple network devices, such that the service provider may correlate short term network service deviations and/or long term network service deviations with one or more queues and/or one or more network devices.

Figure 2:
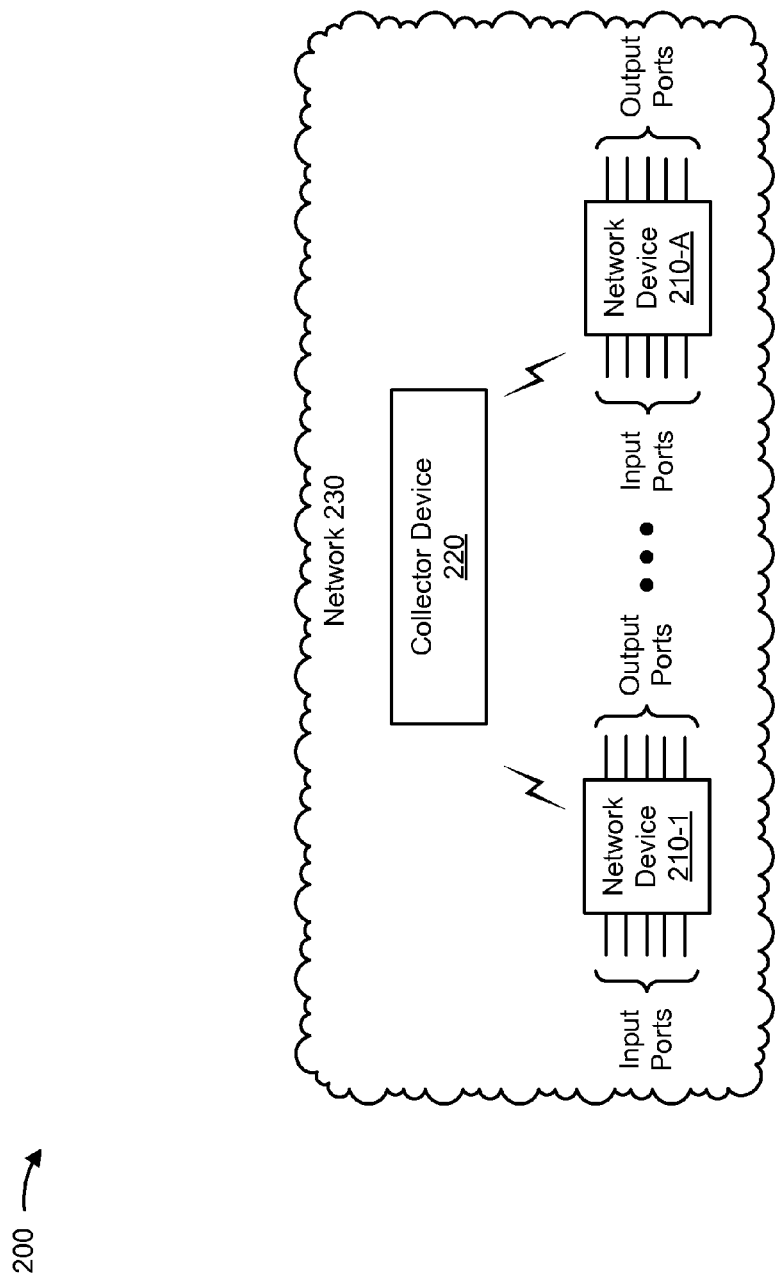
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include one or more network devices 210-1 through 210-A (A≥1) (hereinafter referred to collectively as network devices 210, and individually as network device 210), a collector device 220, and a network 230. Devices of environment 200 may interconnect via wired connections, wireless connections, or a combination of wired and wireless connections.

Network device 210 may include a device capable of receiving, transmitting, processing, and/or routing packets travelling via network 230. For example, network device 210 may include a switch, a router, a server, a gateway, a modem, a firewall, a NIC, a hub, a bridge, a OADM, or another type of data transfer device included in network 230. In some implementations, network device 210 (e.g., one or more components of network device 210) may be capable of implementing a protocol used to synchronize clocks throughout network 230 (e.g., precision time protocol (PTP)). In some implementations, network device 210 may include one or more input ports associated with receiving packets and one or more output ports associated with transmitting packets. In some implementations, network device 210 may be included in network 230.

Collector device 220 may include a device capable of receiving, correlating, storing, processing, analyzing, and/or providing information associated with one or more queues managed by one or more network devices 210. For example, collector device 220 may include a server, a computing device (e.g., a laptop computer, a tablet computer, a handheld computer, etc.), or a similar device. In some implementations, collector device 220 may include a communication interface that allows collector device 220 to receive information from and/or transmit information to one or more network devices 210. In some implementations, collector device 220 may be included in network 230.

Network 230 may include one or more wired and/or wireless networks that include one or more network devices 210 and/or collector devices 220. For example, network 230 may include a local area network ("LAN"), a wide area network ("WAN"), a metropolitan area network ("MAN"), a telephone network (e.g., the Public Switched Telephone Network ("PSTN")), an ad hoc network, an intranet, the Internet, a fiber optic-based network, a private network, a cloud computing network, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3A:
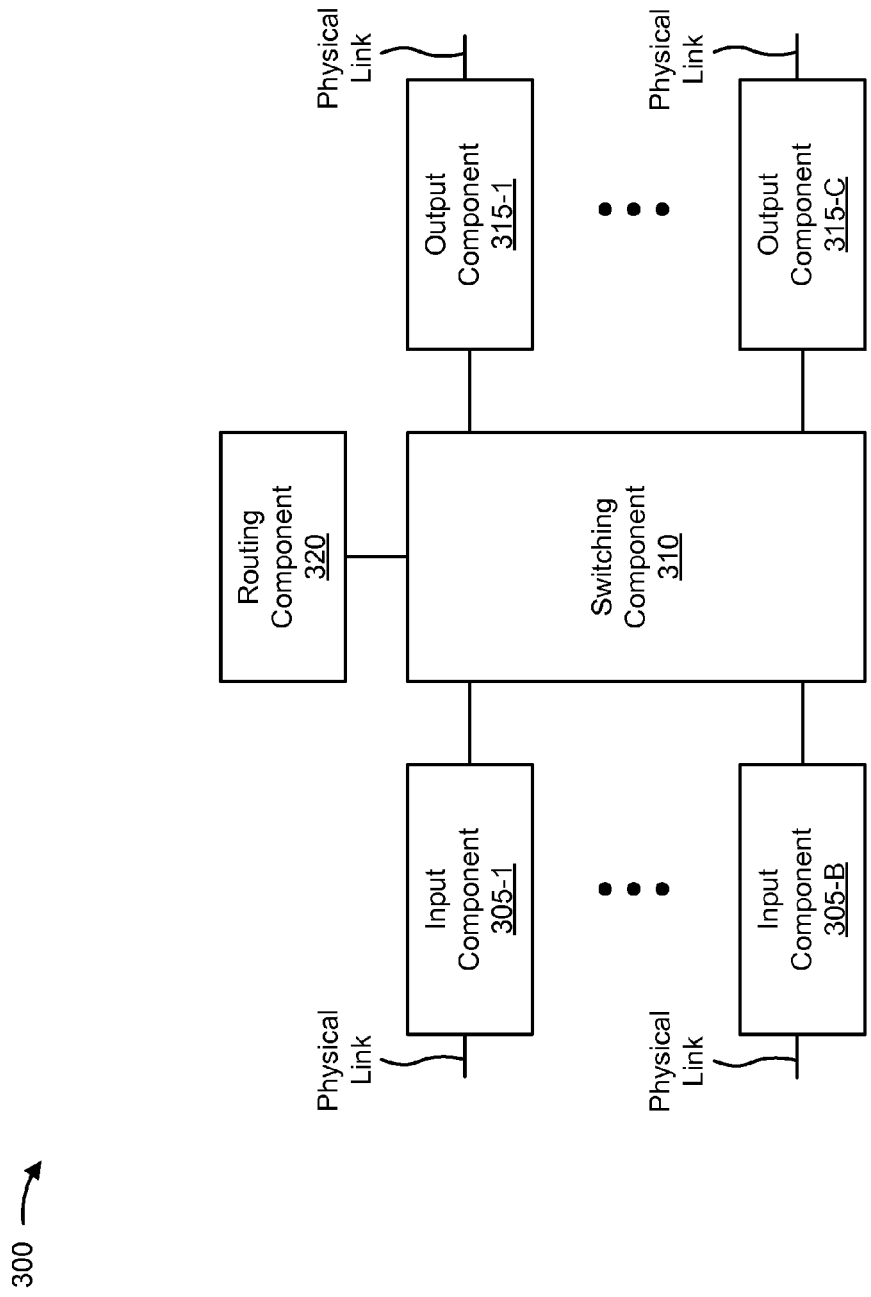
FIG. 3A is a diagram of example components of one or more devices of FIG. 2.

FIG. 3A is a diagram of example components of a device 300. Device 300 may correspond to network device 210. In some implementations, network device 210 may include one or more devices 300 and/or one or more components of device 300. As shown in FIG. 3A, device 300 may include one or more input components 305-1 through 305-B (B≥1) (hereinafter referred to collectively as input components 305, and individually as input component 305), a switching component 310, one or more output components 315-1 through 315-C(C≥1) (hereinafter referred to collectively as output components 315, and individually as output component 315), and a routing component 320.

Input component 305 may include points of attachment for physical links and may be points of entry for incoming traffic, such as packets. Input component 305 may process incoming traffic, such as by performing data link layer encapsulation or decapsulation. In some implementations, input component 305 may send packets to output component 315 via switching component 310.

In some implementations, input component 305 may include an input line card corresponding to a set of input ports associated with network device 210. In some implementations, input component 305 may include a set of input packet processing chips, and each input packet processing chip may include an embedded processing component (herein referred to as an EP component), a congestion manager component, and a local processor. Additional details regarding input component 305 are described below with regard to FIG. 4A.

Switching component 310 may interconnect input components 305 with output components 315. Switching component 310 may be implemented using one or more of multiple, different techniques. For example, switching component 310 may be implemented via busses, via crossbars, and/or with shared memories. The shared memories may act as temporary buffers to store traffic from input components 305 before the traffic is eventually scheduled for delivery to output components 315. In some implementations, switching component 310 may enable input components 305, output components 315, and/or routing component 320 to communicate.

Output component 315 may include points of attachment for physical links and may be points of exit for outgoing traffic, such as packets. Output component 315 may store packets and may schedule packets for transmission on output physical links. Output component 315 may include scheduling algorithms that support priorities and guarantees. Output component 315 may support data link layer encapsulation or decapsulation, and/or a variety of higher-level protocols. In some implementations, output component 315 may send packets and/or receive packets.

In some implementations, output component 315 may include an output line card corresponding to a set of output ports associated with network device 210. In some implementations, output component 315 may include a set of output packet processing chips, and each output packet processing chip may include an EP component, and a local processor. Additional details regarding output component 315 are described below with regard to FIG. 4B.

Routing component 320 may include one or more processors, microprocessors, field-programmable gate arrays (FPGAs), application-specific integrated circuit (ASICs), or similar types of processing components. In some implementations, routing component 320 may communicate with other devices, networks, and/or systems connected to device 300 to exchange information regarding network topology. Routing component 320 may create routing tables based on the network topology information, create forwarding tables based on the routing tables, and forward the forwarding tables to input components 305 and/or output components 315. Input components 305 and/or output components 315 may use the forwarding tables to perform route lookups for incoming packets.

The number and arrangement of components shown in FIG. 3A are provided as an example. In practice, device 300 may include additional components, fewer components, different components, or differently arranged components than those shown in FIG. 3A. Additionally, or alternatively, a set of components (e.g., one or more components) of device 300 may perform one or more functions described as being performed by another set of components of device 300.

Figure 3B:
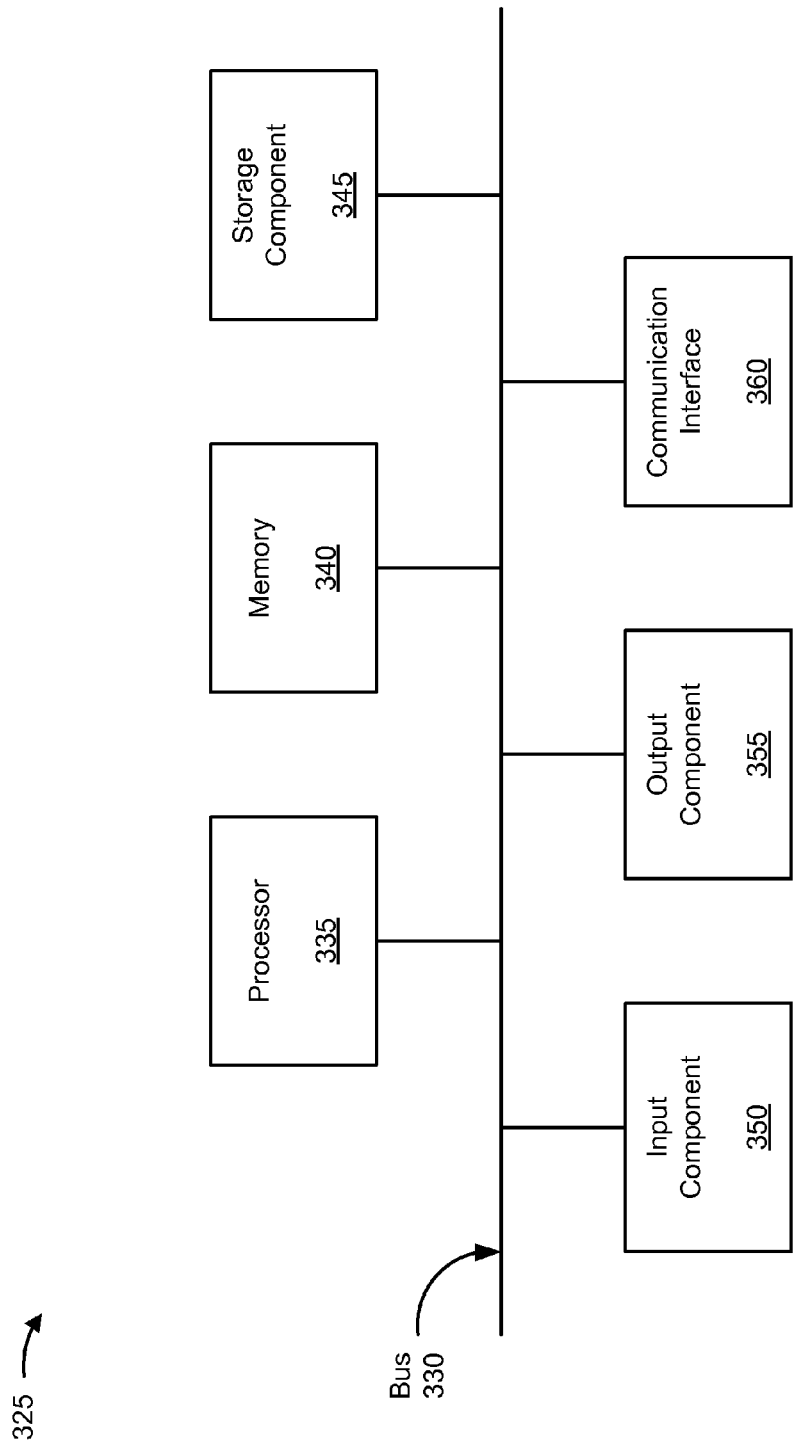
FIG. 3B is another diagram of example components of one or more devices of FIG. 2.

FIG. 3B is a diagram of example components of a device 325. Device 325 may correspond to collector device 220. In some implementations, collector device 220 may include one or more devices 325 and/or one or more components of device 325. As shown in FIG. 3B, device 325 may include a bus 330, a processor 335, a memory 340, a storage component 345, an input component 350, an output component 355, and a communication interface 360.

Bus 330 may include a component that permits communication among the components of device 325. Processor 335 may include a processor (e.g., a central processing unit (CPU), a graphics processing unit (GPU), an accelerated processing unit (APU), etc.), a microprocessor, and/or any processing component (e.g., an FPGA, an ASIC, etc.) that interprets and/or executes instructions. Memory 340 may include a random access memory (RAM), a read only memory (ROM), and/or another type of dynamic or static storage device (e.g., a flash memory, a magnetic memory, an optical memory, etc.) that stores information and/or instructions for use by processor 335.

Storage component 345 may store information and/or software related to the operation and use of device 325. For example, storage component 345 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 325 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 355 may include a component that provides output information from device 325 (e.g., a display, a speaker, one or more light-emitting diodes (LEDs), etc.).

Communication interface 360 may include a transceiver-like component (e.g., a transceiver, a separate receiver and transmitter, etc.) that enables device 325 to communicate with other devices, such as via a wired connection, a wireless connection, or a combination of wired and wireless connections. Communication interface 360 may permit device 325 to receive information from another device and/or provide information to another device. For example, communication interface 360 may include an Ethernet interface, an optical interface, a coaxial interface, an infrared interface, a radio frequency (RF) interface, a universal serial bus (USB) interface, a Wi-Fi interface, a cellular network interface, or the like.

Device 325 may perform one or more processes described herein. Device 325 may perform these processes in response to processor 335 executing software instructions stored by a computer-readable medium, such as memory 340 and/or storage component 345. A computer-readable medium is defined herein as a non-transitory memory device. A memory device includes memory space within a single physical storage device or memory space spread across multiple physical storage devices.

Software instructions may be read into memory 340 and/or storage component 345 from another computer-readable medium or from another device via communication interface 360. When executed, software instructions stored in memory 340 and/or storage component 345 may cause processor 335 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3B are provided as an example. In practice, device 325 may include additional components, fewer components, different components, or differently arranged components than those shown in FIG. 3B. Additionally, or alternatively, a set of components (e.g., one or more components) of device 325 may perform one or more functions described as being performed by another set of components of device 325.

FIGS. 4A and 4B are diagrams of example components of input component 305 and output component 315, respectively. As shown in FIG. 4A, in some implementations, input component 305 may include a group of input packet processing chips 410-1 through 410-D (D≥1) (hereinafter referred to collectively as input packet processing chips 410, and individually as input packet processing chip 410), and each input packet processing chip 410 may include an EP component 412 and a congestion manager component 414. As shown, input component 305 may also include a local processor 420.

Input packet processing chip 410 may include an integrated circuit, included in input component 305, capable of performing one or more functions associated with receiving, modifying, queuing, and/or transmitting (e.g., to output component 315) packets received via input component 305. In some implementations, input packet processing chip 410 may be capable of time stamping a packet received by input packet processing chip 410. Additionally, or alternatively, input packet processing chip 410 may be capable of managing multiple input queues (e.g., VOQs) that correspond to output queues managed by one or more output packet processing chips of output component 315. Additionally, or alternatively, input packet processing chip 410 may be capable of receiving a packet, identifying an output queue via which the packet is to be provided, and placing the packet in an input queue, managed by input packet processing chip 410, corresponding to the identified output queue. In some implementations, each input component 305 may include multiple input packet processing chips 410, and each input packet processing chip 410 may include an EP component 412 and a congestion manager 414.

EP component 412 may include a processor (e.g., a CPU, a GPU, an APU, etc.), a microprocessor, and/or any processing component (e.g., an FPGA, an ASIC, etc.) embedded on input packet processing chip 410. In some implementations, EP component 412 may be capable of receiving (e.g., from output component 315) a latency event notification, associated with an output queue, and determining performance information associated with an input queue, managed by input packet processing chip 410, that corresponds to the output queue identified in the latency event notification. In some implementations, EP component 412 may be capable of providing the performance information to local processor 420 and/or collector device 220.

Congestion manager 414 may include a component of input packet processing chip 410 capable of tracking input queue lengths of input queues (e.g., VOQs) managed by input packet processing chip 410, and performing congestion management techniques, such as random early detection (RED) and flow control. In some implementations, congestion manager 414 may be capable of determining congestion information for multiple input queues managed by input packet processing chip 410, and providing the congestion information to local processor 420 and/or collector device 220.

Local processor 420 may include a processor (e.g., a CPU, a GPU, an APU, etc.), a microprocessor, and/or any processing component (e.g., an FPGA, an ASIC, etc.) included in input component 305. In some implementations, local processor 420 may be capable of receiving, from input packet processing chip 410, performance information associated with an input queue, managed by input packet processing chip 410, that corresponds to an output queue managed by output packet processing chip 430. In some implementations, local processor 420 may receive multiple sets of performance information, associated with multiple input queues managed by multiple input packet processing chips 410, that correspond to the output queue managed by an output packet processing chip of output component 315. In some implementations, local processor 420 may be capable of receiving, storing, analyzing, processing, and/or providing performance information, associated with multiple input queues managed by multiple input packet processing chips 410.

The number and arrangement of components shown in FIG. 4A are provided as an example. In practice, input component 305 may include additional components, fewer components, different components, or differently arranged components than those shown in FIG. 4A. Additionally, or alternatively, a set of components (e.g., one or more components) of input component 305 may perform one or more functions described as being performed by another set of components of input component 305.

As shown in FIG. 4B, in some implementations, output component 315 may include a group of output packet processing chips 430-1 through 430-E (E≥1) (hereinafter referred to collectively as output packet processing chips 430, and individually as output packet processing chip 430), and each output packet processing chip 430 may include an EP component 432. As shown, output component 315 may also include a local processor 440.

Output packet processing chip 430 may include an integrated circuit, included in output component 315, capable of performing one or more functions associated with receiving, queuing, and/or transmitting packets received from input components 305. In some implementations, output packet processing chip 430 may be capable of determining residence time, associated with a packet to be transmitted via an output queue managed by output packet processing chip 430, and storing counter information associated with the output queue and the packet. Additionally, or alternatively, input packet processing chip 410 may be capable of managing multiple output queues. In some implementations, each output component 315 may include multiple output packet processing chips 430, and each output packet processing chip 430 may include an EP component 432.

EP component 432 may include a processor (e.g., a CPU, a GPU, an APU, etc.), a microprocessor, and/or any processing component (e.g., an FPGA, an ASIC, etc.), embedded on output packet processing chip 430. In some implementations, EP component 432 may be capable of determining counter information, associated with an output queue managed by output packet processing chip 430 and determining an average residence time, associated with the output queue, based on the counter information. Additionally, or alternatively, EP component 432 may be capable of determining that a latency event, associated with an output queue, has occurred, and generating and providing (e.g., to one or more input packet processing chips 410) a latency event notification associated with the output queue. Additionally, or alternatively, EP component 432 may be capable of providing counter information, associated with one or more output queues, managed by output packet processing chip 430, to local processor 440 and/or collector device 220.

Local processor 440 may include a processor (e.g., a CPU, a GPU, an APU, etc.), a microprocessor, and/or any processing component (e.g., an FPGA, an ASIC, etc.) included in output component 315. In some implementations, local processor 440 may be capable of receiving, from output packet processing chip 430, counter information associated with an output queue, managed by output packet processing chip 430. In some implementations, local processor 440 may receive multiple sets of counter information, associated with multiple output queues managed by multiple output packet processing chips 430. In some implementations, local processor 440 may be capable of receiving, storing, analyzing, processing, and/or providing performance information, associated with multiple output queues managed by multiple output packet processing chips 430.

The number and arrangement of components shown in FIG. 4B are provided as an example. In practice, output component 315 may include additional components, fewer components, different components, or differently arranged components than those shown in FIG. 4B. Additionally, or alternatively, a set of components (e.g., one or more components) of output component 315 may perform one or more functions described as being performed by another set of components of output component 315.

FIG. 5 is a flow chart of an example process 500 for determining a residence time, associated with a packet received by a network device and being transmitted via an output queue, associated with the network device, and storing counter information associated with the output queue. In some implementations, one or more process blocks of FIG. 5 may be performed by one or more components of network device 210.

As shown in FIG. 5, process 500 may include receiving a packet (block 505). For example, input packet processing chip 410 (e.g., input component 305) may receive a packet. In some implementations, input packet processing chip 410 may receive the packet after another device provides the packet to network device 210, such as another network device 210.

In some implementations, input packet processing chip 410 may receive the packet via an input port associated with input packet processing chip 410. For example, input component 305 may be configured to receiving packets via multiple input ports, and input packet processing chip 410 (e.g., included in input component 305) may be configured to receive packets via one or more of the multiple input ports associated with input component 305. In this example, input packet processing chip 410 may receive the packet via a particular input port of the one or more of input ports.

A packet may include a network packet (e.g., a formatted unit of data carried via network 230) that is to be transmitted by network device 210 (e.g., to another network device 210, to another device, etc.). In some implementations, the packet may include information that identifies a source associated with the packet (e.g., a source media access control (MAC) address, a source internet protocol (IP) address, a source port, or the like), a destination associated with the packet (e.g., a destination MAC address, a destination IP address, a destination port number, or the like), information that identifies a manner in which the packet is to be processed (e.g., a quality of service (QoS) level, a class associated with the packet, etc.) and/or other information associated with processing, forwarding, queuing, and/or providing the packet.

As further shown in FIG. 5, process 500 may include modifying the packet to include an arrival time associated with receiving the packet (block 510). For example, input packet processing chip 410 may modify the packet to include an arrival time associated with the packet. In some implementations, input packet processing chip 410 may modify that packet after input packet processing chip 410 receives the packet (e.g., immediately upon receipt, within a particular amount of time of receiving the packet, or the like).

In some implementations, input packet processing chip 410 may modify the packet by time stamping the packet. For example, input packet processing chip 410 may receive the packet, and input packet processing chip 410 may time stamp the packet such that the packet includes information identifying a time at which the packet was received (e.g., a time of day, an interval count, etc.). In some implementations, modifying the packet may mean storing data in a field of the packet or attaching the data to the packet (e.g., prepending that data to the packet, appending the data to the packet).

In some implementations, network devices 210, included in network 230, may implement a protocol used to synchronize clocks throughout network 230, such as PTP (e.g., as described by Institute of Electrical and Electronics Engineers (IEEE) standard 1588). In this way, input packet processing chips 410 and output packet processing chips 430 of network devices 210 may achieve clock accuracy in the sub-microsecond (e.g., nanosecond) range when determining residence time, latency, delay, etc. of a packet travelling via network device 210. In some implementations, may time stamp the packet based on information associated with the packet. For example, if network device 210 is configured to determine residence times for packets assigned to a particular QoS level, then input packet processing chip 410 may time stamp the packet only if the packet is assigned to the particular QoS level.

As further shown in FIG. 5, process 500 may include adding the packet to an input queue associated with an output queue that is to transmit the packet (block 515). For example, input packet processing chip 410 may add the packet to an input queue associated with an output queue that is to transmit the packet. In some implementations, input packet processing chip 410 may add the packet to the input queue after input packet processing chip 410 modifies the packet to include an arrival time associated with receiving the packet. Additionally, or alternatively, input packet processing chip 410 may add the packet to the input queue after input packet processing chip 410 identifies an input queue to which the packet is to be added, as described below.

In some implementations, input packet processing chip 410 may add the packet to an input queue based on information included in the packet. For example, the packet may include information that identifies a destination (e.g., a destination MAC address) associated with the packet, and input packet processing chip 410 may determine (e.g., based on information stored by input packet processing chip 410) an output port via which the packet is to be provided in order to reach the destination (e.g., the destination MAC address). In this example, input packet processing chip 410 may identify an output queue, corresponding to the output port. Input packet processing chip 410 may then add the packet to an input queue (e.g., a virtual output queue), managed by input packet processing chip 410, that corresponds to the output queue. In some implementations, input packet processing chip 410 may manage a set of input queues (e.g., a set of virtual output queues), where each input queue, of the set of input queues, corresponds to a different output queue (e.g., associated with one or more output packet processing chips 430). In this way, each input packet processing chip 410, included in each input component 305 of network device 210, may manage an input queue that corresponds to a particular output queue associated with transmitting the packet.

In some implementations, input packet processing chip 410 may provide the packet to output packet processing chip 430 (e.g., included in output component 315) after input packet processing chip 410 adds the packet to the input queue. For example, input packet processing chip 410 may add the packet to an input queue that includes other packets to be provided via the output queue (e.g., packets received at an earlier time), input packet processing chip 410 may provide the other packets from the input queue (e.g., to output packet processing chip 430 that manages the output queue), and input packet processing chip 410 may provide the packet to output packet processing chip 430 when the packet reaches the front of the input queue. Output packet processing chip 430 may receive the packet and may add the packet to the output queue managed by output packet processing chip 430.

As further shown in FIG. 5, process 500 may include determining a residence time, associated with the packet, before transmitting the packet (block 520). For example, output packet processing chip 430 may determine a residence time, associated with the packet, before transmitting the packet. In some implementations, output packet processing chip 430 may determine a residence time, associated with the packet, after output packet processing chip 430 receives the packet from input packet processing chip 410. Additionally, or alternatively, output packet processing chip 430 may determine the residence time after output packet processing chip 430 adds the packet to the output queue, as described above. Additionally, or alternatively, output packet processing chip 430 may determine the residence time when output packet processing chip 430 provides the packet via a port associated with output component 315 (e.g., output packet processing chip 430 may determine the residence time immediately before (or within a particular amount of time before) output packet processing chip 430 transmits the packet).

A residence time of a packet may include a quantity of time from an arrival time (e.g., a time that the packet is received by network device 210) to a transmission time (e.g., a time that the packet is transmitted by network device 210). In some implementations, output packet processing chip 430 may determine the residence time, associated with the packet, based on the arrival time included in the packet. For example, output packet processing chip 430 may receive the packet provided by input packet processing chip 410 (e.g., including information that identifies the arrival time of the packet), and output packet processing chip 430 may be ready to transmit the packet (e.g., when the packet reaches the front of the output queue, when the packet is dequeued from the output queue, or the like). In this example, output packet processing chip 430 may determine the residence time of the packet as the difference between the arrival time and a time at which output packet processing chip 430 is ready to transmit the packet.

As further shown in FIG. 5, process 500 may include storing counter information associated with the residence time and the output queue (block 525). For example, output packet processing chip 430 may store counter information associated with the residence time and the output queue. In some implementations, output packet processing chip 430 may store the counter information after output packet processing chip 430 determines the residence time associated with the packet.

Counter information, associated with an output queue, may include information associated with one or more packets transmitted via the output queue during an interval of time. For example, the counter information may identify a quantity of packets transmitted during an interval of time (e.g., a one millisecond interval, a 100 milliseconds interval, a one second interval, etc.), a quantity of bytes (e.g., a total quantity of bytes provided via the output queue during the interval of time), a maximum residence time (e.g., a maximum residence time associated with any packet provided via the output queue during the interval of time), a total residence time (e.g., a total residence time of all packets provided via the output queue during the interval of time), and/or other information relating to the residence time. In some implementations, output packet processing chip 430 may store the counter information in a memory storage component of output packet processing chip 430.

In some implementations, the counter information may be associated with a particular interval of time. For example, output packet processing chip 430 may be configured to store counter information in 100 millisecond intervals of time. In this example, output component 315 may store counter information, associated with a first packet (e.g., received at a first time during the 100 millisecond interval of time), as the first packet is provided via the output queue, may update the counter information, based on a second packet (e.g., received at a second time during the 100 millisecond interval of time), as the second packet is provided via the output queue, and so on. In some implementations, output packet processing chip 430 may determine the residence time for multiple packets during the interval of time. Additionally, or alternatively, output packet processing chip 430 may be configurable such the interval of time, associated with storing and/or updating the counter information, may be modified (e.g., by a user associated with network device 210). In some implementations, output packet processing chip 430 may determine the residence times for packets received during multiple (e.g., consecutive) intervals of time. In some implementations, output packet processing chip 430 may repeatedly determine packet residence times and store counter information, associated with the output queue, in order to allow output packet processing chip 430 to determine whether a latency event, associated with the output queue, has occurred, as described below.

In this way, network device 210 may receive a packet to be transmitted via an output queue, may determine a residence time associated with the packet before the packet is transmitted via the output queue, and may store counter information associated with the output queue before the packet is transmitted via the output queue. In some implementations, network device 210 (e.g., multiple output packet processing chips 430) may store counter information for multiple output queues (e.g., hundreds of output queues, thousands of output queues, etc.).

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6A:
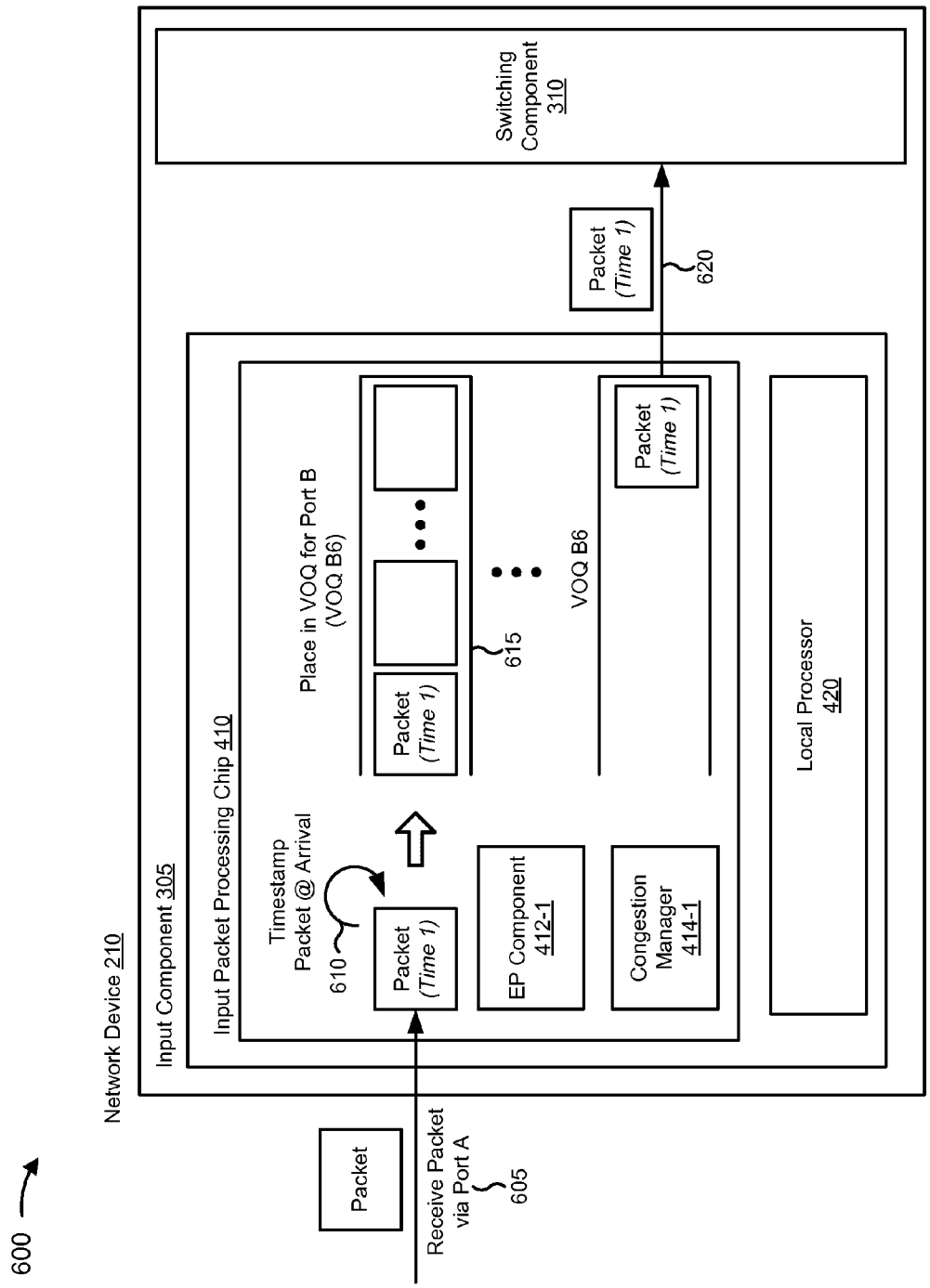
FIGS. 6A and 6B are diagrams of an example implementation relating to the example process shown in FIG. 5.
Figure 6B:
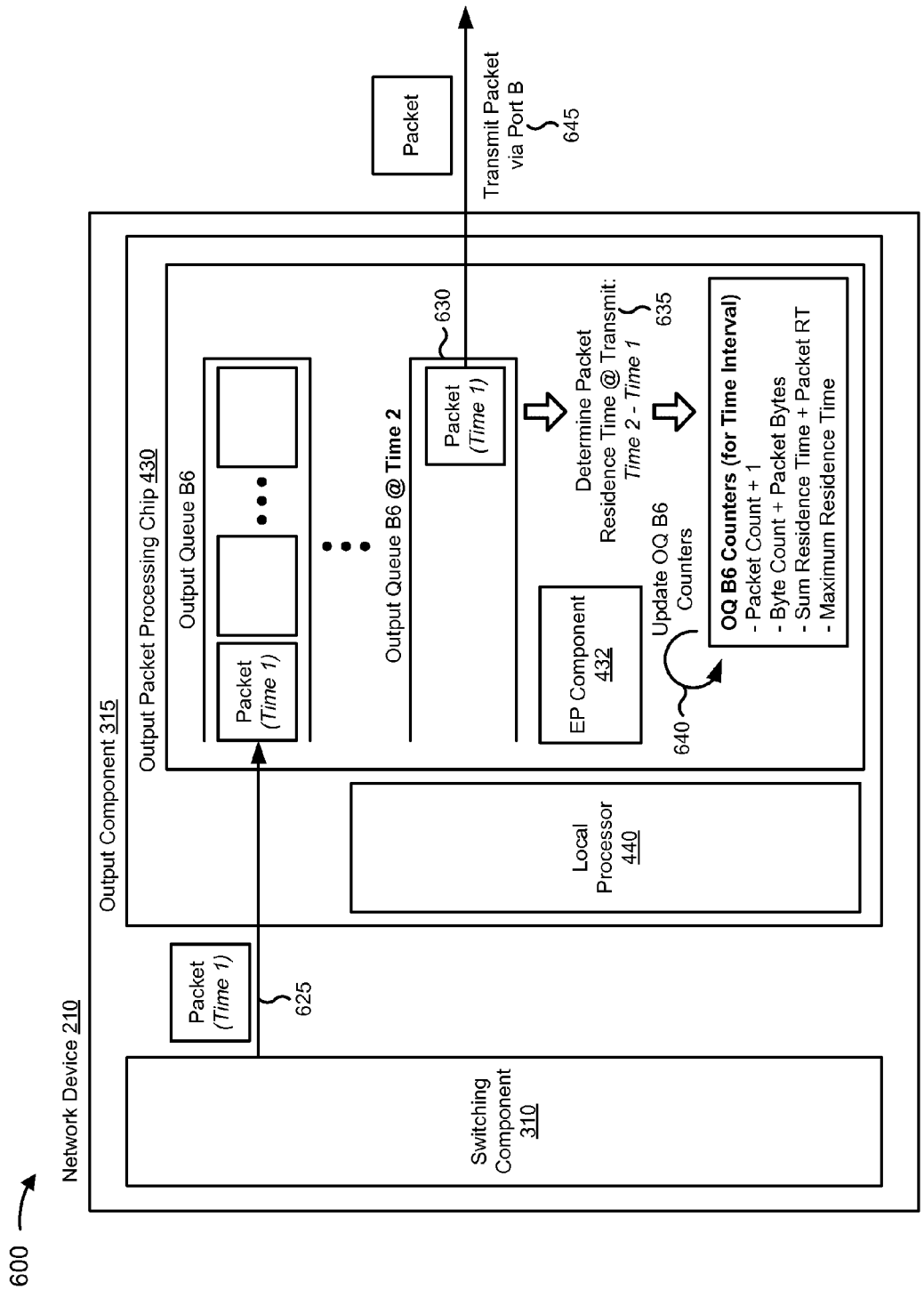

FIGS. 6A and 6B are diagrams of an example implementation 600 relating to example process 500 shown in FIG. 5. For the purposes of example implementation 600, assume that input packet processing chip 410, included in input component 305 of network device 210, is configured to receive packets via an input port (e.g., port A).

As shown in FIG. 6A, and by reference number 605, input packet processing chip 410 may receive a packet via port A. As shown by reference number 610, input packet processing chip 410 may time stamp the packet with an arrival time (e.g., time 1). For the purposes of example implementation 600, assume that input packet processing chip 410 manages a set of input queues (e.g., a set of virtual output queues), each that correspond to an output queue managed by output packet processing chips 430 included in network device 210. As shown by reference number 615, input packet processing chip 410 may determine (e.g., based on information included in the packet) that the packet is to be provided via a particular an output port (e.g., port B), and may identify an output queue (e.g., OQ B6) associated with the output port. As shown, input packet processing chip 410 may then identify a particular input queue (e.g., virtual output queue (VOQ) B6), managed by input packet processing chip 410, that corresponds to OQ B6, and may place the packet in VOQ B6. As shown by reference number 620, input packet processing chip 410 may provide the packet (e.g., via switching component 310) when the packet reaches the front of VOQ B6.

For the purposes of FIG. 6B, assume that output packet processing chip 430, included in output component 315 of network device 210, is configured to provide packets via port B. Further, assume that output packet processing chip 430 manages OQ B6 associated with port B. As shown in FIG. 6B, and by reference number 625, output packet processing chip 430 may receive the packet provided by input packet processing chip 410, and may place the packet in OQ B6. As shown by reference number 630, the packet may reach the front of OQ B6 and output packet processing chip 430 may be ready to transmit the packet via port B (e.g., at time 2). As shown by reference number 635, just before transmitting the packet via port B, output packet processing chip 430 may determine a residence time associated with the packet (e.g., time 2–time 1). As shown by reference number 640, output packet processing chip 430 may update counter information associated with OQ B6 by increasing a packet count by one, by increasing a byte count by a quantity of bytes included in the packet, by adding the determined residence time to a running total of residence times, by updating a maximum residence time (e.g., if the determined residence time is longer than a previously stored maximum residence time), or the like.

As indicated above, FIGS. 6A and 6B are provided merely as an example. Other examples are possible and may differ from what was described with regard to FIGS. 6A and 6B.

Figure 7:
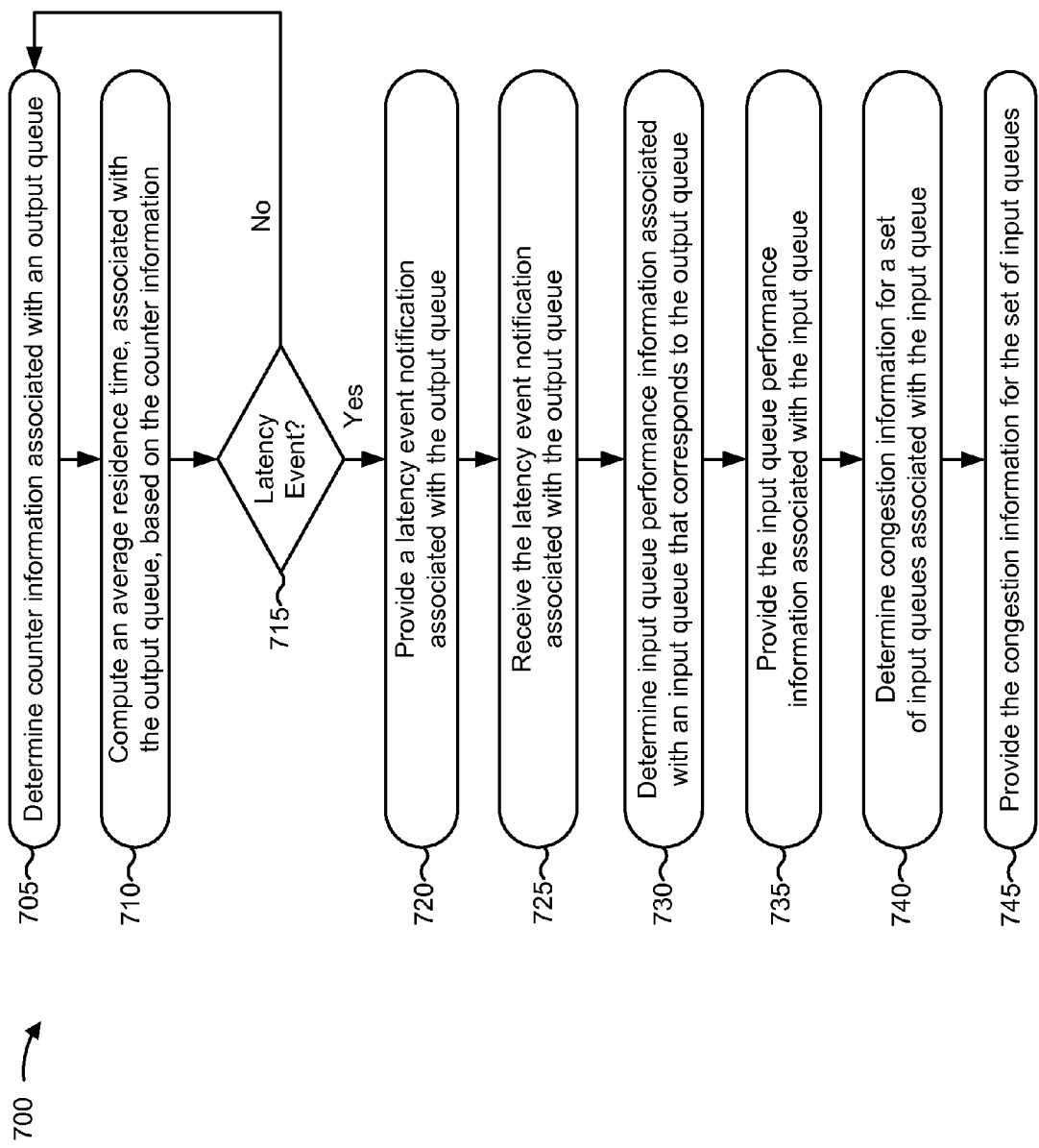
FIG. 7 is a flow chart of an example process for identifying a latency event, associated with an output queue, determining performance information associated with an input queue corresponding to the output queue, and determining congestion information for a set of input queues associated with the input queue.

FIG. 7 is a flow chart of an example process 700 for identifying a latency event, associated with an output queue, determining performance information associated with an input queue corresponding to the output queue, and determining congestion information for a set of input queues associated with the input queue. In some implementations, one or more process blocks of FIG. 7 may be performed by one or more components of network device 210.

As shown in FIG. 7, process 700 may include determining counter information associated with an output queue (block 705). For example, EP component 432 (e.g., included in output packet processing chip of output component 315) may determine counter information associated with an output queue. In some implementations, EP component 432 may determine the counter information, associated with the output queue, after output packet processing chip 430 stores and/or updates the counter information, as described above. Additionally, or alternatively, EP component 432 may determine the counter information when EP component 432 receives an indication that EP component 432 is to determine the counter information (e.g., when EP component 432 receives an indication to determine whether a latency event has occurred, at an interval of time associated with storing and/or updating the counter information).

In some implementations, EP component 432 may determine the counter information, associated with the output queue, based on a configuration of EP component 432. For example, EP component 432 may be configured to (e.g., automatically) determine whether a latency event, associated with the output queue, has occurred at an interval of time (e.g., every 100 milliseconds, every millisecond, every second, etc.). In this example, EP component 432 may determine counter information, associated with the output queue and stored by output packet processing chip 430, for the most recent interval of time (e.g., the most recent 100 millisecond interval of time, the most recent millisecond interval of time, the most recent second interval of time, etc.). Additionally, or alternatively, EP component 432 may determine counter information based on user input (e.g., when a user of network device 210 provides input indicating that EP component 432 is to determine whether a latency event, associated with the output queue, has occurred).

In some implementations, EP component 432 may determine the counter information based on information stored by output packet processing chip 430. For example, output packet processing chip 430 may store and/or update the counter information in a memory location associated with output packet processing chip 430 (e.g., as described above). Here, EP component 432 may determine the counter information based on the information stored by output packet processing chip 430. In some implementations, EP component 432 may delete the counter information from the memory location when EP component 432 determines the information (e.g., to allow additional counter information to be stored by output packet processing chip 430). Additionally, or alternatively, output packet processing chip 430 may delete the counter information from the memory location after EP component 432 determines the counter information.

As further shown in FIG. 7, process 700 may include computing an average residence time, associated with the output queue, based on the counter information (block 710). For example, EP component 432 may compute an average residence time, associated with the output queue, based on the counter information. In some implementations, EP component 432 may compute the average residence time after EP component 432 determines the counter information associated with the output queue. Additionally, or alternatively, EP component 432 may compute the average residence time, associated with the output queue, when EP component 432 receives an indication to compute the average residence time (e.g., when EP component 432 receives an indication to determine whether a latency event has occurred).

In some implementations, EP component 432 may compute the average residence time based on the counter information. For example, assume that output packet processing chip 430 has stored counter information during an interval of time. Here, if the counter information identifies a quantity of packets provided via the output queue during the interval of time, and a total residence time (e.g., a sum of all packet residence times) for the quantity of packets provided via the output queue during the interval of time, then EP component 432 may compute an average residence time by dividing the total residence time by a value equal to the quantity of packets. Additionally, or alternatively, EP component 432 may compute the average residence time in another manner.

As further shown in FIG. 7, process 700 may include determining whether a latency event, associated with the output queue, has occurred (block 715). For example, EP component 432 may determine whether a latency event, associated with the output queue, has occurred. In some implementations, EP component 432 may determine whether the latency event has occurred after EP component 432 computes the average residence time associated with the output queue. Additionally, or alternatively, EP component 432 may determine whether the latency event has occurred after EP component 432 determines the counter information associated with the output queue.

A latency event may include an event, associated with an output queue, indicating that the output queue has experienced an amount of latency that exceeds a threshold amount. In some implementations, EP component 432 may determine whether a latency event has occurred based on the average residence time. For example, EP component 432 may compute the average residence time for an interval of time, and may compare the average residence time to an average residence time threshold (e.g., stored or accessible by EP component 432). In this example, if the average residence time is greater than the average residence time threshold, then EP component 432 may determine that a latency event, associated with the output queue, has occurred.

Additionally, or alternatively, EP component 432 may determine whether a latency event has occurred based on other counter information. For example, EP component 432 may determine counter information that identifies a maximum residence time of any packet provided via the output queue during the interval of time. Here, EP component 432 may compare the maximum residence time to a maximum residence time threshold (e.g., stored or accessible by EP component 432). In this example if the maximum residence time is greater than the maximum residence time threshold, then EP component 432 may determine that a latency event, associated with the output queue, has occurred.

In some implementations, if a latency event has occurred, then EP component 432 may provide the counter information, and time of day information associated with the counter information, to local processor 440 and/or collector device 220 (e.g., for correlation, analysis, processing, aggregation, etc). Additionally, or alternatively, if a latency event has not occurred, then EP component 432 may not provide the counter information, associated with the output queue, to local processor 440 or collector device 220. In this way, EP component 432 may filter counter information such that only counter information associated with latency events is provided to local processor 440 and/or collector device 220.

As further shown in FIG. 7, if a latency event has not occurred, (block 715—NO) then process 700 may include returning to block 705. For example, EP component 432 may determine, based on the average residence time and/or the other counter information, that a latency event has not occurred, and EP component 432 may not provide a latency event notification, may not provide the counter information to local processor 440 or collector device 220, or the like. In some implementations, process 700 may return to block 705 and the EP component 432 may determine counter information, associated with the output queue, at the next time interval (e.g., one millisecond later, 100 milliseconds later, one second later, etc.).

As further shown in FIG. 7, if a latency event has occurred (block 715—YES), then process 700 may include providing a latency event notification associated with the output queue (block 720). For example, EP component 432 may determine that a latency event has occurred, and EP component 432 may provide a latency event notification associated with the output queue. In some implementations, EP component 432 may provide the latency event notification after EP component 432 determines that the latency event has occurred. Additionally, or alternatively, EP component 432 may provide the latency event notification when EP component 432 receives an indication that EP component 432 is to provide the latency event notification.

A latency event notification may include information indicating that an output queue has experienced a latency event. In some implementations, the latency event notification may include information associated with the output queue, such as information that identifies the output queue (e.g., an output queue identifier, an output queue number, etc.), information that identifies a port associated with the output queue (e.g., a port number, a port identifier, etc.), information that identifies the latency event (e.g., an average residence time latency event, a maximum residence time latency event, etc.), time of day associated with the latency event, and/or other information associated with latency event and/or the output queue.

In some implementations, EP component 432 may provide the latency event notification to input packet processing chips 410 (e.g., included in one or more input components 305). For example, EP component 432 may broadcast the latency event notification (e.g., using a fast path) to EP components 412 (e.g., included in one or more input packet processing chips 410 of one or more input components 305). In this way, the latency event notification may be provided to each input packet processing chip 410 that manages an input queue (e.g., a virtual output queue) corresponding to the output queue.

As further shown in FIG. 7, process 700 may include receiving the latency event notification associated with the output queue (block 725). For example, EP component 412 (e.g., included in input packet processing chip 410 of input component 305) may receive the latency event notification associated with the output queue. In some implementations, EP component 412 may receive the latency event notification after EP component 432 provides the latency event notification. In some implementations, multiple EP components 412 may receive the latency event notification as described above.

As further shown in FIG. 7, process 700 may include determining input queue performance information associated with an input queue that corresponds to the output queue (block 730). For example, EP component 412 may determine input queue performance information associated with an input queue that corresponds to the output queue (hereinafter referred to as corresponding input queue performance information). In some implementations, EP component 412 may determine the corresponding input queue performance information after EP component 412 receives the latency event notification associated with the output queue.

In some implementations, EP component 412 may determine the corresponding input queue performance information based on monitoring the corresponding input queue. For example, EP component 412 may receive a latency event notification indicating that a particular output queue has experienced a latency event, and EP component 412 may identify a particular input queue (e.g., a particular virtual output queue) that corresponds to the output queue (e.g., a particular virtual output queue that sends packets to the output queue). In this example, EP component 412 may then monitor the particular input queue in order to determine the corresponding input queue performance information, such as a queue occupancy level, a queue drain rate, or the like.

In some implementations, EP component 412 may monitor the corresponding input queue for a period of time. For example, EP component 412 may monitor the input queue for a period of time (e.g., 1 millisecond, 100 milliseconds, etc.) after receiving the latency event notification. Additionally, or alternatively, EP component 412 may monitor the corresponding input queue until EP component 412 receives an indication that EP component 412 is to stop monitoring the corresponding input queue. For example, EP component 432 may determine that the average residence time at a next time interval is below an average residence time threshold, and may provide, to EP component 412, an indication that the output queue is no longer experiencing the latency event. In this example, EP component 412 may stop monitoring the corresponding input queue when EP component 412 receives the indication. In some implementations, each EP component 412 (e.g., included in each input component 305) may monitor an input queue that corresponds to the output queue (e.g., such that each VOQ that corresponds to the output queue is monitored).

As further shown in FIG. 7, process 700 may include providing the input queue performance information associated with the input queue (block 735). For example, EP component 412 may provide the corresponding input queue performance information. In some implementations, EP component 412 may provide the corresponding input queue performance information when EP component 412 determines the corresponding input queue performance information. Additionally, or alternatively, EP component 412 may provide the corresponding input queue performance information when EP component 412 receives an indication that EP component 412 is to provide the corresponding input queue performance information.

In some implementations, EP component 412 may provide the corresponding input queue performance information, and time of day information associated with the corresponding input queue performance information, to local processor 420 and/or collector device 220 (e.g., for correlation, analysis, processing, aggregation, etc). In this way, input queue performance information for each input queue (e.g., each virtual output queue) that corresponds to the output queue, may be collected and provided to local processor 420 and/or collector device 220.

As further shown in FIG. 7, process 700 may include determining congestion information for a set of input queues associated with the input queue (block 740). For example, congestion manager 414 (e.g., included in input packet processing chip 410 of input component 305) may determine congestion information for a set of input queues associated with the input queue. In some implementations, congestion manager 414 may determine the congestion information when EP component 412 receives the latency event notification (e.g., when congestion manager 414 is configured to determine the congestion information based on EP component 412 receiving a latency event notification). Additionally, or alternatively, congestion manager 414 may determine the congestion information when congestion manager 414 receives an indication to determine the congestion information.

In some implementations, the congestion information may include congestion information associated with one or more other input queues associated with the input queue that corresponds to the output queue that experiences the latency event. For example, EP component 412 may manage multiple input queues, each corresponding to an output queue. Here, when a particular output queue experiences a latency event, EP component 412, upon receiving a latency event notification, may begin monitoring an input queue that corresponds to the particular output queue. In this example, congestion manager 414 may determine congestion information associated with a set of other input queues (e.g., managed by input packet processing chip 410), such as a packet loss rate, a queue depth, or the like. In some implementations, congestion manager 414 may determine the congestion information based on a class associated with an input queue. For example, congestion manager 414 may determine the congestion information for a class of packets, such as "don't drop" packets, for "best effort" packets, etc. In some implementations, congestion manager 414 may determine congestion information for multiple (e.g., hundreds, thousands, etc.) of other input queues.

As further shown in FIG. 7, process 700 may include providing the congestion information for the set of input queues (block 745). For example, congestion manager 414 may provide the congestion information. In some implementations, congestion manager 414 may provide the congestion information when congestion manager 414 determines the congestion information. Additionally, or alternatively, congestion manager 414 may provide the congestion information when congestion manager 414 receives an indication that congestion manager 414 is to provide the congestion information.

In some implementations, congestion manager 414 may provide the congestion information, and time of day information associated with the congestion information, to local processor 420 and/or collector device 220 (e.g., for correlation, analysis, processing, aggregation, etc). As such, congestion information for multiple input queues may be collected and provided to local processor 420 and/or collector device 220.

In this way, network device 210 may determine, based on packet residence times, that an output queue is congested (e.g., experiencing a latency event), and may determine performance information associated with input queues corresponding to the output queue, as well as congestion information associated with other input queues. Based on analyzing the counter information, the performance information, and/or the congestion information, local processor 420 and/or local processor 440 may identify corrective actions (e.g., to be implemented in network device 210) in order to improve queue performance of network device 210 (e.g., to reduce queue congestion). Similarly, based on analyzing counter information, performance information, and/or congestion information associated with multiple network devices 210, collector device 220 may correlate network service deviations across multiple network devices. This may allow collector device 220 to identify short term and/or long term trends in terms of latency inside network 230, and/or may allow collector device 210 to perform debugging, perform capacity planning, determine historical trends, enforce service level agreements, or the like.

In order to correlate across multiple network devices 210, a particular protocol (e.g., PTP) may be used to synchronize clocks throughout network 230. Reporting latency events, which are associated with a time of day, may allow collector device 220 to identify simultaneous queue performance information and/or congestion information across multiple network devices 210 (e.g., if a particular network device 210 experiences a latency event at a particular time, then collector device 220 may be able correlate queue performance information and/or congestion information with other activities across other network devices 210).

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

Figure 8A:
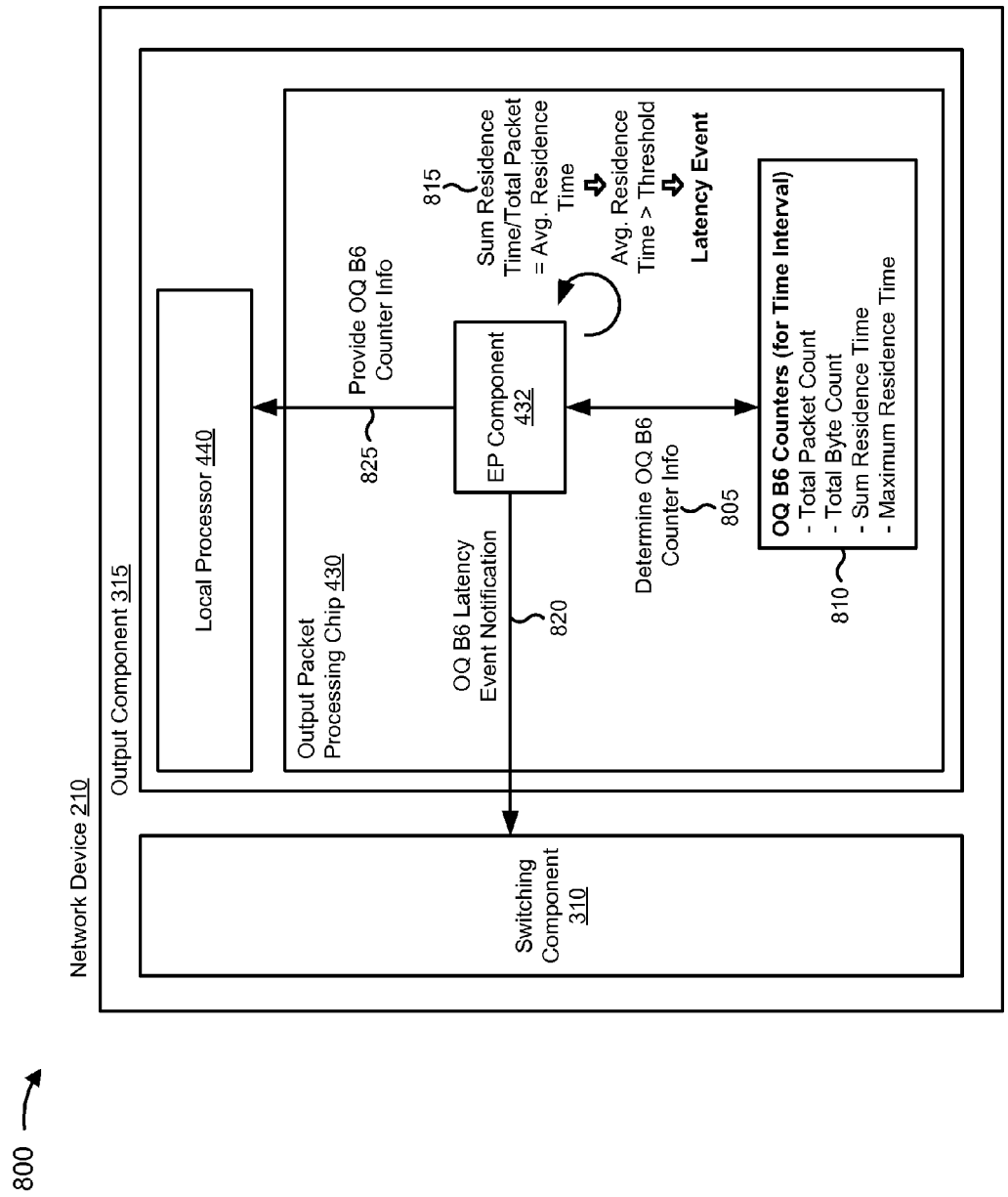
FIGS. 8A and 8B are diagrams of an example implementation relating to the example process shown in FIG. 7.
Figure 8B:
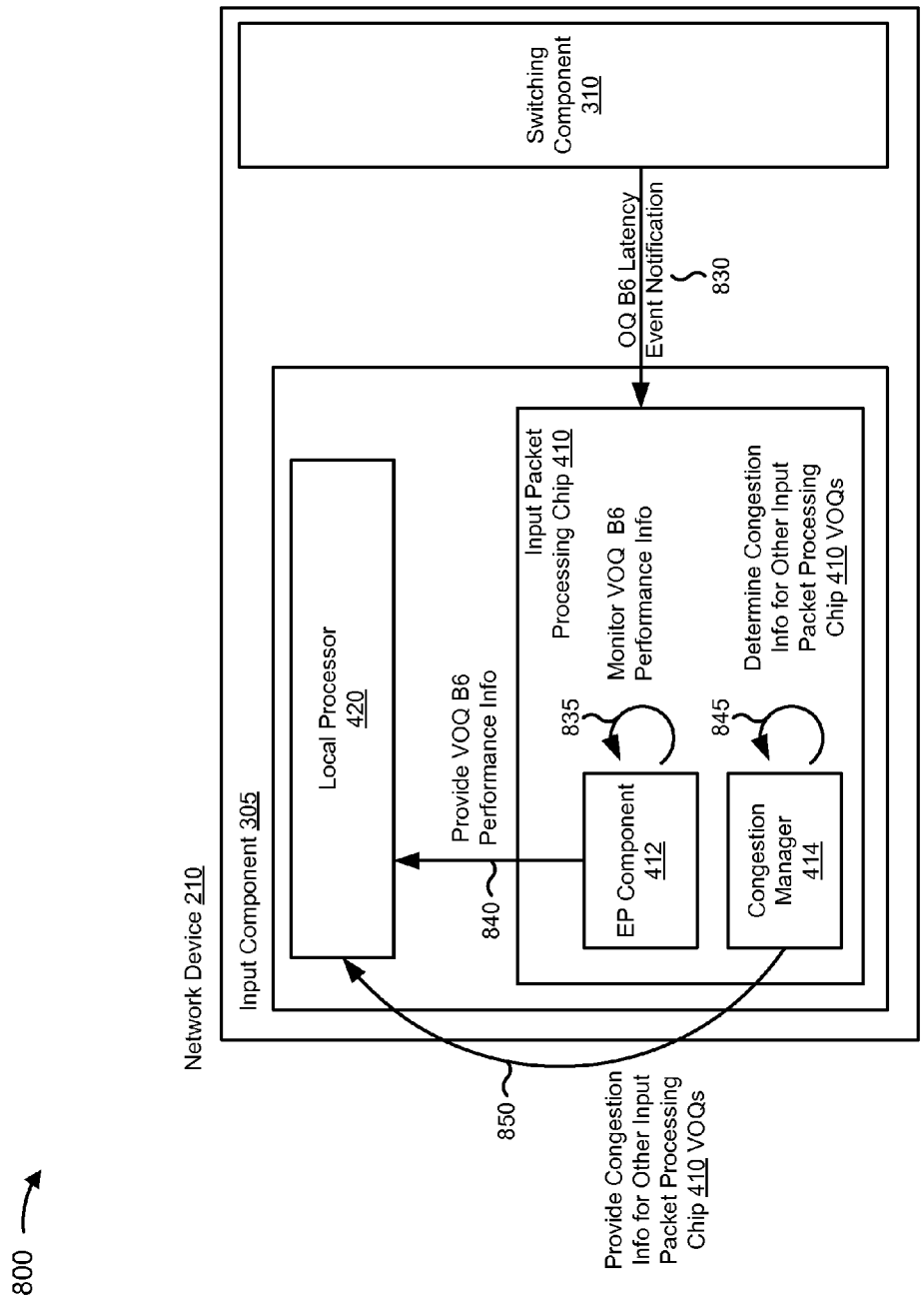

FIGS. 8A and 8B are diagrams of an example implementation 800 relating to example process 700 shown in FIG. 7. For the purposes of example implementation 800, assume that output packet processing chip 430 is included in output component 315 of network device 210, and manages an output queue (e.g., OQ B6). Further, assume that EP component 432, embedded in output packet processing chip 430, is configured to determine whether a latency event, associated with OQ B6, has occurred at a particular interval of time, and that EP component 432 has determined that the interval of time has lapsed such that EP component 432 is to determine whether OQ B6 has experienced a latency event.

As shown in FIG. 8A and by reference number 805, EP component 432 may determine counter information associated with a group of packets provided via OQ B6 during the interval of time. As shown by reference number 810, the counter information may identify a total quantity of packets provided via OQ B6 during the interval of time, a total quantity of bytes associated with the packets provided via OQ B6 during the interval of time, a sum of residence times for the packets provided via OQ B6 during the interval of time, a maximum residence time of any packet provided via OQ B6 during the interval of time, and/or another type of information. As shown by reference number 815, EP component 432 may determine an average residence time for packets provided via OQ B6 during the interval of time (e.g., sum residence time/total packet count=average residence time), and may determine that the average residence time is greater than an average residence time threshold (e.g., stored or accessible by EP component 432). As further shown, EP component 432 may determine that OQ B6 has experienced a latency event since the average residence time exceeds the average residence time threshold. As shown by reference number 820, EP component 432 may provide a latency event notification that is to be received by input packet processing chips 410 that manage input queues that correspond to the OQ B6. As show by reference number 825, EP component 432 may also provide the OQ B6 counter information (e.g., and time of day information associated with the counter information) to local processor 440 for correlation, analysis, processing, storage, etc. (e.g., assume that EP component 432 is to provide counter information, associated with an output queue, to local processor 440 when EP component 432 determines that the output queue has experienced a latency event).

For the purposes of FIG. 8B, assume that input packet processing chip 410 manages an input queue (e.g., a virtual output queue) that corresponds to OQ B6, identified as VOQ B6 (e.g., other input packet processing chips 410 may manage other virtual output queues that also correspond to OQ B6). As shown by reference number 830, input packet processing chip 410 may receive the OQ B6 latency event notification provided by EP component 432. As shown by reference number 835, EP component 412, embedded in input packet processing chip 410, upon receiving the OQ B6 latency event notification, may monitor VOQ B6 performance information (e.g., occupancy level, drain rate, or the like). For the purposes of FIG. 8B, assume that EP component 412 is configured to monitor the performance information for a period of time after receiving a latency event notification. As shown by reference number 835, EP component 412 may monitor VOQ B6 performance information for the period of time, and, as shown by reference number 840, EP component 412 may provide the VOQ B6 performance information (e.g., and time of day information associated with the VOQ B6 performance information) to local processor 420 for analysis, correlation, processing, storage, etc.

As shown by reference number 845, congestion manager 414, embedded in input packet processing chip 410, upon receiving the OQ B6 latency event notification, may determine congestion information associated with other input queues (e.g., other virtual output queues) managed by input packet processing chip 410. As shown by reference number 850, congestion manager 414 may provide the congestion information (e.g., and time of day information associated with the congestion information) to local processor 420. In this way, network device 210 may determine counter information associated with OQ B6, performance information associated with VOQ B6, and congestion information associated with other input queues managed by input packet processing chip 410 such that collector device 220 (e.g., associated with the service provider and network device 210) may analyze, correlate, process, store, etc. information associated with a latency event. For example, collector device 220 may collect the performance information associated with VOQ B6, and the congestion information associated with other input queues managed by input packet processing chip 410, and may notify one or more other network devices 210 to throttle the flow of packets to network device 210 (e.g., in order to prevent another latency event due to input queue congestion).

As indicated above, FIGS. 8A and 8B are provided merely as an example. Other examples are possible and may differ from what was described with regard to FIGS. 8A and 8B.

Implementations described herein may allow a network device, included in a service provider network (e.g., that implements a protocol used to synchronize network device clocks throughout the service provider network), to identify a latency event, associated with an output queue managed by the network device. The network device may also determine performance information, associated with an input queue corresponding to the output queue, and determine congestion information for a set of other input queues associated with the input queue. In this way, the service provider may collect performance information and/or congestion information, associated with multiple network devices, that may allow the service provider to correlate short term network service deviations and/or long term network service deviations with one or more queues and/or one or more network devices.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

As used herein, a packet may refer to a network packet, a frame, a datagram, a segment, a fragment of a packet, a fragment of a frame, a fragment of a datagram, a fragment of a segment, or any other formatted or unformatted unit of data capable of being transmitted via a network.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A network device, comprising:
   an output circuit; and
   an input circuit,
      the output circuit to:
         determine counter information associated with a packet provided via an output queue,
            the output queue being managed by the output circuit,
         determine, based on the counter information, an average packet residence time associated with a group of packets provided via the output queue,
            the average packet residence time being determined based on packet residence times of the group of packets and a quantity of the group of packets, and
            the group of packets including the packet,
         compare the average packet residence time and an average packet residence time threshold,
         determine, based on the counter information and based on comparing the average packet residence time and the average packet residence time threshold, that a latency event, associated with the output queue, has occurred,
         provide, based on determining that the latency event has occurred, the counter information and time of day information associated with the counter information, and
         provide, based on determining that the latency event has occurred, a latency event notification associated with the output queue; and
      the input circuit to:
         receive the latency event notification associated with the output queue,
         determine performance information associated with an input queue,
            the input queue corresponding to the output queue and being managed by the input circuit, and
         provide the performance information associated with the input queue and time of day information associated with the performance information.

2. The network device of claim 1, where the input circuit is further to:
   receive the packet via an input port associated with the input circuit;
   time stamp the packet with a time of day at which the packet was received;
   add the packet, after time stamping the packet, to the input queue that corresponds to the output queue; and
   provide the packet from the input queue to the output circuit.

3. The network device of claim 2, where the output circuit is further to:
   receive the packet provided by the input circuit;
   add the packet to the output queue,
      the output queue being associated with an output port;
   determine a residence time, associated with the packet, before transmitting the packet via the output port;
   store counter information, associated with the output queue, based on the residence time; and
   where the output circuit, when determining the counter information associated with the packet provided via the output queue, is to:
      determine the counter information based on the stored counter information.

4. The network device of claim 1, where the input circuit is further to:
   determine congestion information for a set of input queues,
      the set of input queues being managed by the input circuit; and
   provide the congestion information and time of day information associated with the congestion information.

5. The network device of claim 1, where the counter information, the time of day information associated with the counter information, the performance information, and the time of day information associated with the performance information are provided to another device to permit the other device to correlate the counter information and the performance information based on the time of day information associated with the counter information and the time of day information associated with the performance information.

6. The network device of claim 1, where the input circuit and the output circuit implement a protocol associated with synchronizing network device clocks across multiple network devices,
   the multiple network devices including the network device.

7. The network device of claim 1, where the output circuit, when determining the average packet residence time, is to:

determine the average packet residence time based on dividing a sum of the packet residence times of the group of packets by the quantity of the group of packets.

8. A device, comprising:
an output component; and
an input component,
the output component to:
determine counter information associated with a packet provided via an output queue,
the output queue being associated with the output component;
determine, based on the counter information, an average packet residence time associated with a group of packets provided via the output queue,
the average packet residence time being determined based on packet residence times of the group of packets and a quantity of the group of packets, and
the group of packets including the packet;
compare the average packet residence time and an average packet residence time threshold;
determine, based on the counter information and based on comparing the average packet residence time and the average packet residence time threshold, that a latency event, associated with the output queue, has occurred;
provide, based on determining that the latency event has occurred, the counter information and time of day information associated with the counter information; and
provide, based on determining that the latency event has occurred, a latency event notification associated with the output queue; and
the input component to:
receive the latency event notification associated with the output queue;
determine performance information associated with an input queue,
the input queue corresponding to the output queue and being associated with the input component; and
provide the performance information associated with the input queue and time of day information associated with the performance information to permit performance information to be correlated with the counter information.

9. The device of claim 8, where the input component is further to:
receive the packet via an input port associated with the input component;
modify the packet to include an arrival time associated with the packet;
add the packet, after modifying the packet, to the input queue that corresponds to the output queue; and
provide the packet to the output component.

10. The device of claim 9, where the output component is further to:
receive the packet provided by the input component;
add the packet to the output queue,
the output queue being associated with an output port;
determine a residence time, associated with the packet, before transmitting the packet via the output port;
store counter information, associated with the output queue, based on the residence time; and
where the output component, when determining the counter information associated with the packet provided via the output queue, is to:
determine the counter information based on the stored counter information.

11. The device of claim 8, where the input component is further to:
determine congestion information for a set of input queues,
the set of input queues being associated with the input component; and
provide the congestion information and time of day information associated with the congestion information.

12. The device of claim 11, where the counter information, the time of day information associated with the counter information, the performance information, the time of day information associated with the performance information, the congestion information, and the time of day information associated with the congestion information are provided to another device to permit the other device to correlate the counter information, the performance information, and the congestion information based on the time of day information associated with the counter information, the time of day information associated with the performance information, and the time of day information associated with the congestion information.

13. The device of claim 8, where the input component and the output component implement a precision time protocol.

14. The device of claim 8, where the output component, when determining the average packet residence time, is to:
determine the average packet residence time based on dividing a sum of the packet residence times of the group of packets by the quantity of the group of packets.

15. A method, comprising:
determining, by an output component included in a network device, counter information associated with a packet provided via an output queue,
the output queue being managed by the output component;
determining, by the output component and based on the counter information, an average packet residence time associated with a group of packets provided via the output queue,
the average packet residence time being determined based on packet residence times of the group of packets and a quantity of the group of packets, and
the group of packets including the packet;
comparing, by the output component, the average packet residence time and an average packet residence time threshold;
determining, by the output component and based on the counter information and based on comparing the average packet residence time and the average packet residence time threshold, that a latency event, associated with the output queue, has occurred;
providing, by the output component and based on determining that the latency event has occurred, the counter information and time of day information associated with the counter information;
providing, by the output component, a latency event notification associated with the output queue;
receiving, by an input component included in the network device, the latency event notification associated with the output queue;
determining, by the input component, performance information associated with an input queue,
the input queue corresponding to the output queue and being managed by the input component;

providing, by the input component, the performance information associated with the input queue and time of day information associated with the performance information;

determining, by the input component, congestion information for a set of input queues,
the set of input queues being associated with the input component; and providing, by the input component, the congestion information and time of day information associated with the congestion information.

16. The method of claim 15, further comprising:

receiving, by the input component, the packet via an input port associated with the input component;

modifying, by the input component, the packet to include information identifying a time at which the packet was received;

adding, by the input component, the packet, after modifying the packet, to the input queue that corresponds to the output queue; and providing, by the input component, the packet to the output component.

17. The method of claim 16, further comprising receiving, by the output component, the packet provided by the input component;

adding, by the output component, the packet to the output queue,
the output queue being associated with an output port;

determining, by the output component, a residence time, associated with the packet, before transmitting the packet via the output port;

storing, by the output component, counter information, associated with the output queue, based on the residence time; and where determining, by the output component, the counter information associated with the packet provided via the output queue comprises:
determining the counter information based on the stored counter information.

18. The method of claim 15, where the counter information, the time of day information associated with the counter information, the performance information, the time of day information associated with the performance information, the congestion information, and the time of day information associated with the congestion information are provided to another device to permit the other device to correlate the counter information, the performance information, and the congestion information based on the time of day information associated with the counter information, the time of day information associated with the performance information, and the time of day information associated with the congestion information.

19. The method of claim 15, where the input component and the output component implement a precision time protocol.

20. The method of claim 15, where determining the average packet residence time comprises:
determining the average packet residence time based on dividing a sum of the packet residence times of the group of packets by the quantity of the group of packets.

* * * * *